(12) United States Patent
Cheselka et al.

(10) Patent No.: US 7,894,351 B2
(45) Date of Patent: Feb. 22, 2011

(54) DETECTION OF LINK STATUS IN BLADE SYSTEMS

(75) Inventors: Harry Cheselka, Raleigh, NC (US); Mitchell L. Loeb, Durham, NC (US); Norman C. Strole, Raleigh, NC (US); Edward S. Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 11/561,846

(22) Filed: Nov. 20, 2006

(65) Prior Publication Data

US 2008/0117830 A1    May 22, 2008

(51) Int. Cl.
*H04L 12/26* (2006.01)

(52) U.S. Cl. ..................... 370/244

(58) Field of Classification Search .............. 370/252, 370/445, 244, 249; 709/223, 228; 714/807
See application file for complete search history.

(56) References Cited

U.S. PATENT DOCUMENTS

| | | | | |
|---|---|---|---|---|
| 4,868,824 A | * | 9/1989 | Golden | 714/807 |
| 5,404,544 A | | 4/1995 | Crayford | |
| 6,026,494 A | | 2/2000 | Foster | |
| 6,961,347 B1 | * | 11/2005 | Bunton et al. | 370/465 |
| 7,010,607 B1 | * | 3/2006 | Bunton | 709/228 |
| 7,664,018 B2 | * | 2/2010 | Warren et al. | 370/230 |
| 2003/0035368 A1 | | 2/2003 | Tanada | |
| 2003/0179711 A1 | | 9/2003 | Huff | |
| 2005/0012544 A1 | | 1/2005 | Shiung | |
| 2005/0047332 A1 | | 3/2005 | Lee et al. | |
| 2005/0058150 A1 | * | 3/2005 | Boles et al. | 370/445 |
| 2005/0063310 A1 | * | 3/2005 | Caldwell et al. | 370/241 |
| 2005/0125527 A1 | * | 6/2005 | Lu et al. | 709/223 |

\* cited by examiner

*Primary Examiner*—Melvin Marcelo
(74) *Attorney, Agent, or Firm*—Brandon C. Kennedy; Cynthia G. Seal; Biggers & Ohanian, LLP

(57) ABSTRACT

A method and a computer program product for detecting link status in a blade system are provided. The method and computer program product provide for generating a first pattern of characters at a server blade of the blade system, transmitting the first pattern of characters from the server blade to an Ethernet switch of the blade system, and comparing a second pattern of characters to the first pattern of characters to determine whether a link from the Ethernet switch to a network is active in response to the server blade receiving the second pattern of characters from the Ethernet switch.

15 Claims, 5 Drawing Sheets

DETECTION OF LINK STATUS IN BLADE SYSTEMS

FIELD OF THE INVENTION

The present invention relates generally to blade systems. More particularly, the present invention is directed to link status detection in blade systems.

BACKGROUND OF THE INVENTION

Blade systems consist of multiple server blades that share non-core computing components, such as those directed to power, cooling, networking, etc. Each server blade, also referred to as a blade, is a computer server that only includes essential computing components, such as processor(s), memory, storage, etc. Thus, blade systems are more space and cost efficient than standard rack systems.

Within a blade system, each server blade may connect to a network through an interface between a network interface component of the server blade, such as a network interface card (NIC), and a shared Ethernet switch of the blade system. The Ethernet switch establishes a link to the network. Due to cross-talk and/or cross-coupling issues (e.g., unwanted interferences from nearby transmissions, false detections at transmission origins, etc.), a keep-alive protocol is usually implemented between a server blade and an entity on the network to determine whether the link to the network is still active. Using a keep-alive protocol, however, requires the use of additional media access control (MAC) addresses as well as extra central processing unit (CPU) cycles.

SUMMARY OF THE INVENTION

A method and a computer program product for detecting link status in a blade system are provided. The method and computer program product provide for generating a first pattern of characters at a server blade of the blade system, transmitting the first pattern of characters from the server blade to an Ethernet switch of the blade system, and comparing a second pattern of characters to the first pattern of characters to determine whether a link from the Ethernet switch to a network is active in response to the server blade receiving the second pattern of characters from the Ethernet switch.

A server blade is also provided. The server blade includes a generator operable to generate a first pattern of characters, a network interface component in communication with the generator, the network interface component being operable to transmit the first pattern of characters to an Ethernet switch and being operable to receive a second pattern of characters from the Ethernet switch, and a comparator in communication with the network interface component, the comparator being operable to compare the second pattern of characters to the first pattern of characters to determine whether a link from the Ethernet switch to a network is active in response to the network interface component receiving the second pattern of characters from the Ethernet switch.

An Ethernet switch is further provided. The Ethernet switch includes a receiver operable to receive a first pattern of characters from a server blade, a state machine in communication with the receiver, the state machine being operable to create a second pattern of characters by adding an additional character to the first pattern of characters, and a transmitter in communication with the state machine, the transmitter being operable to transmit the second pattern of characters to the server blade to notify the server blade that a link from the Ethernet switch to a network is active.

DETAILED DESCRIPTION

Figure 1:
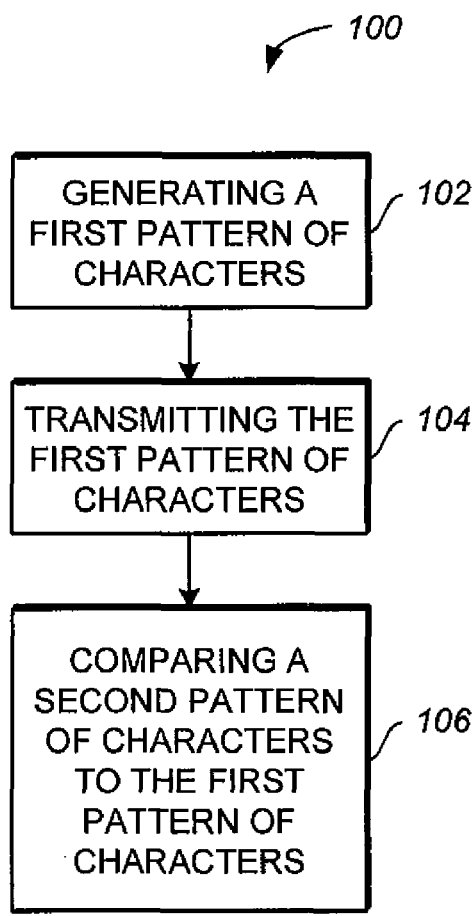
FIGS. 1-2 depict flowcharts of methods for detecting link status in a blade system according to various implementations of the invention.

The present invention relates generally to blade systems and more particularly to link status detection in blade systems. The following description is presented to enable one of ordinary skill in the art to make and use the invention, and is provided in the context of a patent application and its requirements. The present invention is not intended to be limited to the implementations shown, but is to be accorded the widest scope consistent with the principles and features described herein.

With blade systems, certain non-essential computing components, such as power, cooling, and networking components, are shared by multiple server blades (also referred to as blades) since each server blade only includes essential computing components, such as processor, memory, and storage. As a result, blade systems have smaller footprints than rack systems. In addition, server blades cost less to manufacture than rack system computer servers because each blade contains less components.

A blade system may include an Ethernet switch that enables each server blade in the blade system to connect to a network, such as a local area network (LAN), a wide area network (WAN), an intranet, an extranet, etc. To connect to the network, a network interface component of a server blade (e.g., a network interface card (NIC) or a network interface chip) interfaces with the Ethernet switch, which then establishes a link to the network. If the link becomes inoperative, the Ethernet switch can disable the interface with the network interface component of the server blade as a way for the Ethernet switch to notify the server blade of the inoperable status of the link to the network. This solution, however, is unreliable because cross-talk and/or cross-coupling may occur on the interface between the network interface component and the Ethernet switch.

Cross-talk occurs when a signal generated by a network interface component is inadvertently transmitted to an adjacent signal wire. Cross-coupling refers to the problem where a network interface component falsely detects signals not intended for it. As a result, the network interface component perceives a link as being established and active when in fact, no link exists. Hence, oftentimes, the network interface component of a server blade believes the interface with an Ethernet switch is still enabled even though the Ethernet switch has already attempted to disable it. This is a particular problem in blade systems where multiple blades are physically closely wired to a single Ethernet switch. The overall wiring structure is prone to an Ethernet switch falsely detecting a link for an uninstalled blade in an adjacent Ethernet switch port.

Even if the Ethernet switch is able to successfully disable the interface with the network interface component, a higher level program, such as an operating system, on the server blade still has to disable the network interface component and prevent data from being transmitted through the disabled network interface component. When the server blade has a backup network interface component, the higher level program can then enable the backup network interface component and send data through that network interface component.

Since disablement of the interface between a network interface component of a server blade and the Ethernet switch is not always a reliable way for the server blade to detect an inoperable status of a link to a network, a keep-alive protocol may have to be implemented between higher layer software on the server blade, such as an operating system device driver, and an entity on the network. As an example, a request can be periodically issued to the entity. If a response is not received within a set amount of time after a certain number of retries, the link to the network is declared inoperable and the network interface component interface is disabled. However, for the protocol to work correctly, additional media access (MAC) addresses must be used, and more central processing unit (CPU) cycles will be needed.

Depicted in FIG. 1 is a process 100 for detecting link status in a blade system according to an implementation of the invention. At 102, a first pattern of characters is generated at a server blade of the blade system. In one implementation, the characters used to generate the first pattern depend on the type of encoding used. For example, if 8-bit/10-bit encoding is used, the first pattern of characters is a pattern of K-characters. K-characters are special non-data characters that can be used, for example, to indicate idleness or maintain synchronization. There are twelve K-characters: K28.0, K28.1, K28.2, K28.3, K2.8.4, K28.5, K28.6, K28.7, K23.7, K27.7, K29.7, and K30.7. The first pattern of characters is unique to the server blade in one implementation.

The first pattern of characters is transmitted from the server blade to an Ethernet switch of the blade system at 104. In one implementation, the first pattern of characters is transmitted from a network interface component of the server blade to the Ethernet switch. At 106, a second pattern of characters is compared to the first pattern of characters to determine whether a link from the Ethernet switch to a network is active in response to the server blade receiving the second pattern of characters from the Ethernet switch. The second pattern of characters may be received by the network interface component of the server blade.

In one implementation the link from the Ethernet switch to the network is active when the second pattern of characters is based on a known modification of the first pattern of characters. The known modification may be, for example, adding an additional character to the first pattern of characters. Hence, based on the example, if the second pattern of characters is equal to the first pattern of characters plus an additional character, then the link from the Ethernet switch to the network is active.

By transmitting a series of characters between a server blade and an Ethernet switch at the physical layer, link status detection is possible without requiring additional CPU cycles, MAC addresses, or network configuration parameters. In addition, cross-talk and cross-coupling issues between interfaces of different server blades in a blade system are avoided when each server blade of the blade system uses a unique pattern of characters. Cross-talk issues within an interface are also negated by having an Ethernet switch transmit back a modified pattern of characters that is based on the pattern of characters transmitted by the server blade.

Figure 2:
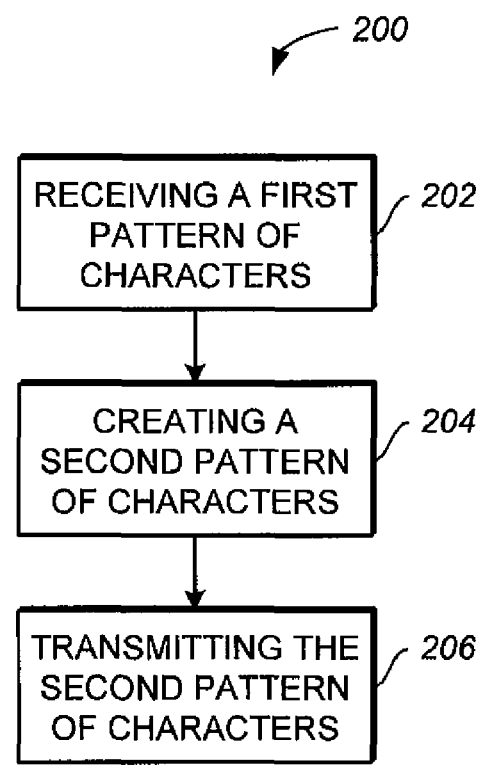

FIG. 2 shows a process 200 for detecting link status in a blade system according to an implementation of the invention. At 202, a first pattern of characters is received from a server blade of the blade system at an Ethernet switch of the blade system. In one implementation, the first pattern of characters is a pattern of K-characters and is unique to the server blade. A second pattern of characters is created at the Ethernet switch at 204 by adding an additional character to the first pattern of characters. The additional character is a next sequential character in one implementation. At 206, the second pattern of characters is then transmitted from the Ethernet switch to the server blade to notify the server blade that a link from the Ethernet switch to a network is active.

Figure 3:
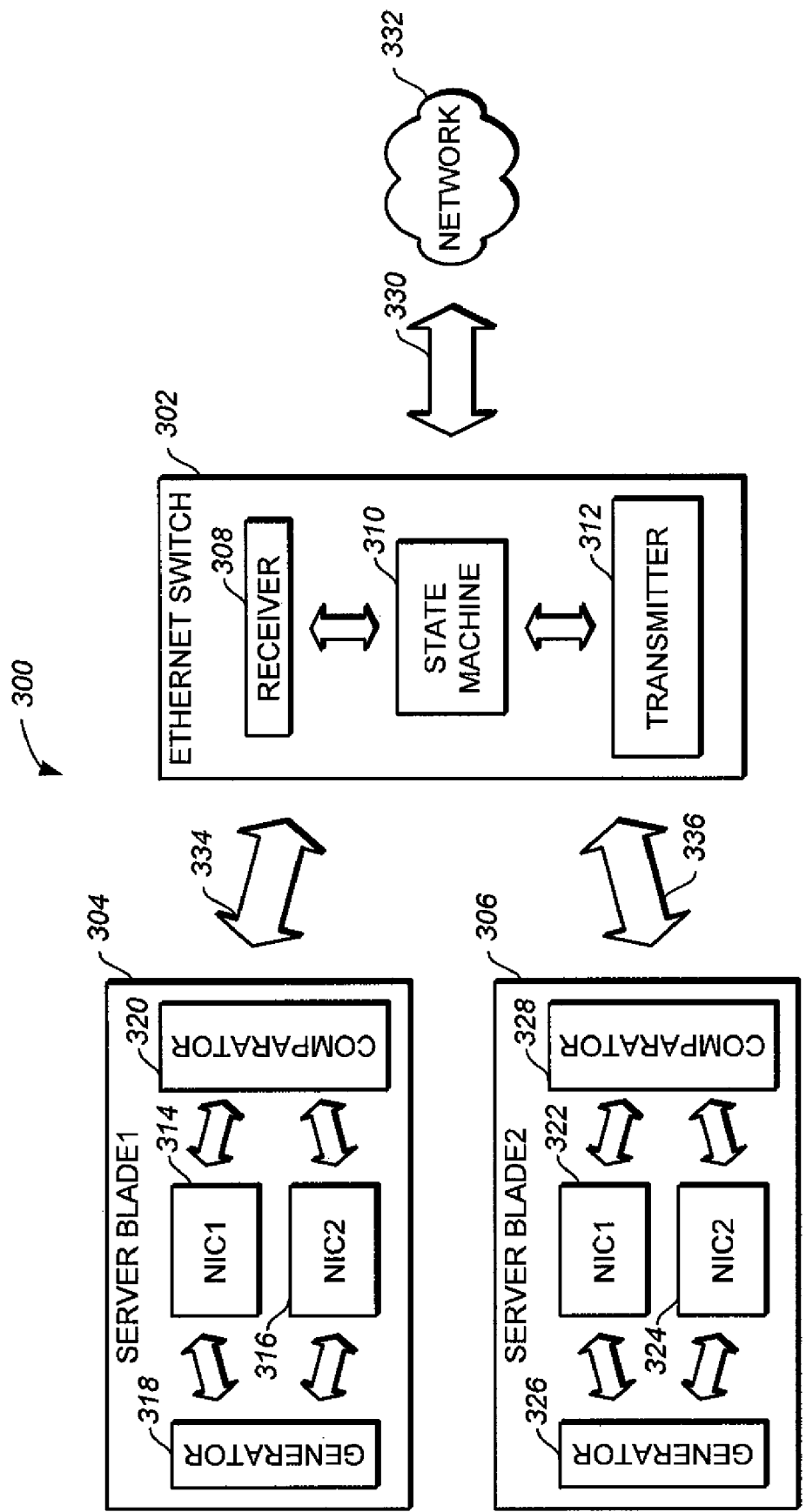
FIG. 3 illustrates a blade system according to an implementation of the invention.

Illustrated in FIG. 3 is a blade system 300 according to an implementation of the invention. Blade system 300 includes an Ethernet switch 302 and server blades 304-306. Ethernet switch 302 includes a receiver 308, a state machine 310, and a transmitter 312. Other components (not shown) may be included in Ethernet switch 302. Server blade 304 includes network interface components 314-316, a generator 318, and a comparator 320. Server blade 306 includes network interface components 322-324, a generator 326, and a comparator 328. In the implementation, network interface components 314-316 and 322-324 are network interface cards (NICs). Each server blade may include more or less network interface components. In addition, other components (not shown) may be included in server blades 304-306.

A link 330 has been established between Ethernet switch 302 a network 332 in FIG. 3. Server blade 304 communicates with Ethernet switch 302 via an interface 334 and server blade 306 communicates with Ethernet switch 302 via an interface 336. In the implementation, generators 318 and 326 in server blades 304 and 306, respectively, are operable to generate a first pattern of characters for the respective server blade. Each of network interface components 314-316 in server blade 304 and network interface components 322-324 in server blade 306 is operable to transmit the first pattern of characters to Ethernet switch 302. In the implementation, network interface components 314 and 322 are used to transmit the first pattern of characters and network interface components 316 and 324 are acting as backups.

Receiver 308 of Ethernet switch 302 is operable to receive the first pattern of characters from each of server blades 304-306. State machine 310, which is in communication with receiver 308, is operable to create a second pattern of characters for each of server blades 304-306 by adding an additional character to the corresponding first pattern of characters. Transmitter 312, which is in communication with state machine 310, is operable to transmit the second pattern of characters for each server blade to the respective server blade.

Each of network interface components 314-316 in server blade 304 and network interface components 322-324 in server blade 306 is also operable to receive the second pattern of characters from Ethernet switch 302. If the second pattern of characters for each server blade is successfully received by the respective network interface component, comparators 320 and 328 in server blades 304 and 306, respectively, are operable to compare the second pattern of characters to the first pattern of characters to determine whether link 330 from Ethernet switch 302 to network 332 is active.

When the second pattern of characters is not received by at least one of the server blades 304-306 within a preset time period, the lack of receipt may be logged into a register (not shown) of the respective server blade. In one implementation, three consecutive misses are required before an operating system of the server blade is interrupted and notified of link 330 being inoperative in order to avoid spurious detections.

The respective primary network interface component can then be disabled and the backup network interface component can be activated.

Figure 4:
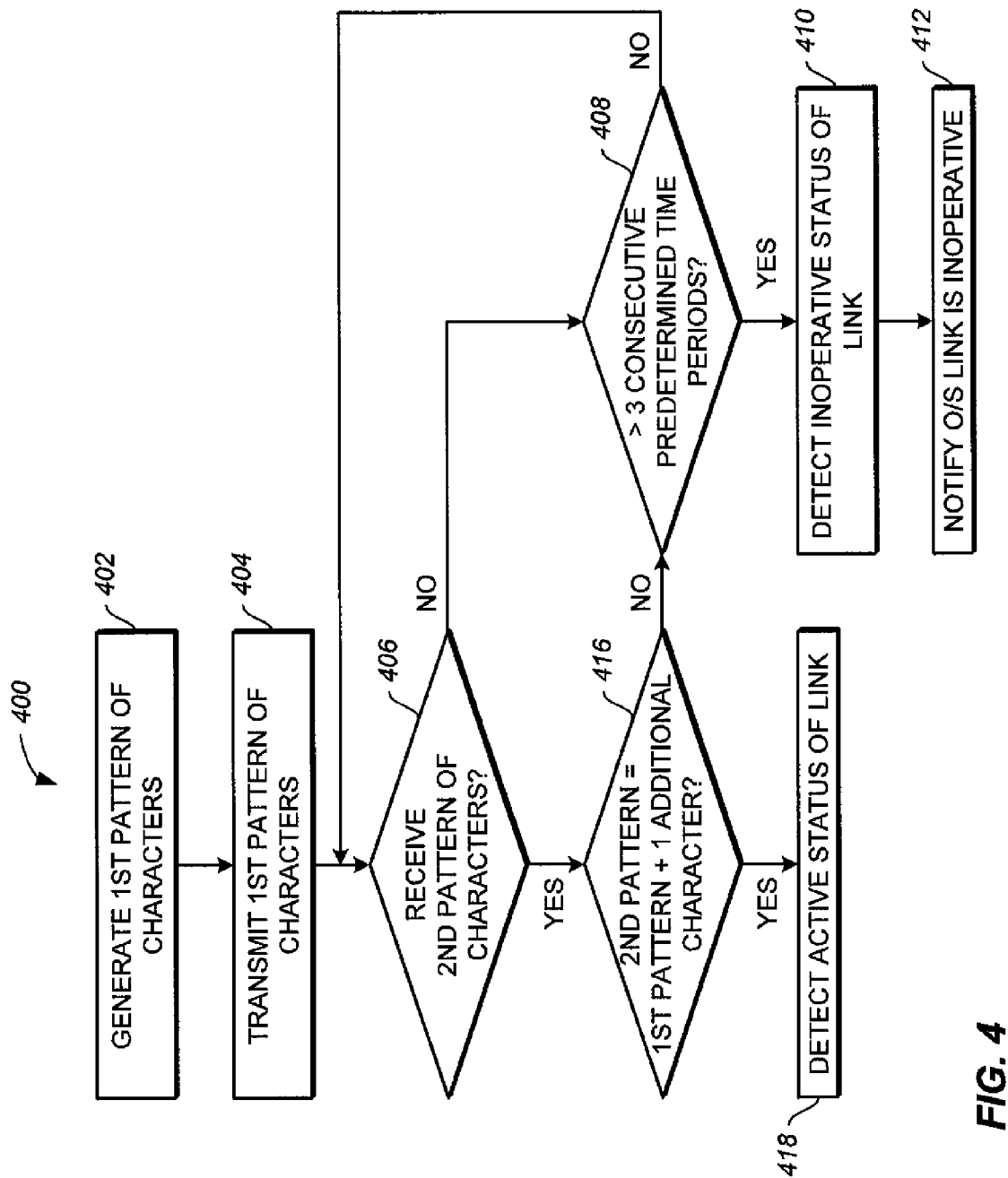
FIG. 4 shows a flowchart of a method for detecting link status in a blade system according to an implementation of the invention.

FIG. 4 depicts a process 400 for detecting link status in a blade system according to an implementation of the invention. At 402, a first pattern of characters is generated at a server blade of the blade system. The first pattern of characters is then transmitted from the server blade to an Ethernet switch of the blade system at 404. A determination is made at 406 as to whether a second pattern of characters has been received by the server blade from the Ethernet switch.

If the second pattern of characters has not been received, a determination is made at 408 as to whether three consecutive predetermined time periods have already passed. When the second pattern of characters is not received by the server blade for three consecutive predetermined time periods, an inoperative status of a link from the Ethernet switch to a network is detected at 410. At 412, an operating system of the server blade is notified of the inoperative status of the link. In response, the operating system can disable an interface between the server blade and the Ethernet switch.

On the other hand, if the second pattern of characters has been received, a determination is made at 416 as to whether the second pattern of characters is equal to the first pattern of characters plus an additional character. When the second pattern of characters is not equal to the first pattern of characters plus an additional character, the process returns to 408. However, when the second pattern of characters is equal to the first pattern of characters plus an additional character, an active status of the link from the Ethernet switch to the network is detected at 418.

Transmission of patterns of characters between an Ethernet switch and server blades of a blade system can occur during interframe gap periods that are built into all Ethernet data transmissions. Additionally, when there are multiple interfaces from multiple blades, the patterns of characters can be transmitted at random times. Random patterns and random time periods help avoid cross-talk that may erroneously indicate at a server blade that a link is good because current idle patterns are too predictable.

Cross-coupling even the smallest amount of signal energy is enough to maintain interface activity since an interface can be maintained by transmitting a repeating sequence of a single idle character. Hence, it is very easy to cross-couple the single repeating character to an adjacent interface because all server blades are trying to detect the idle character.

Figure 5:
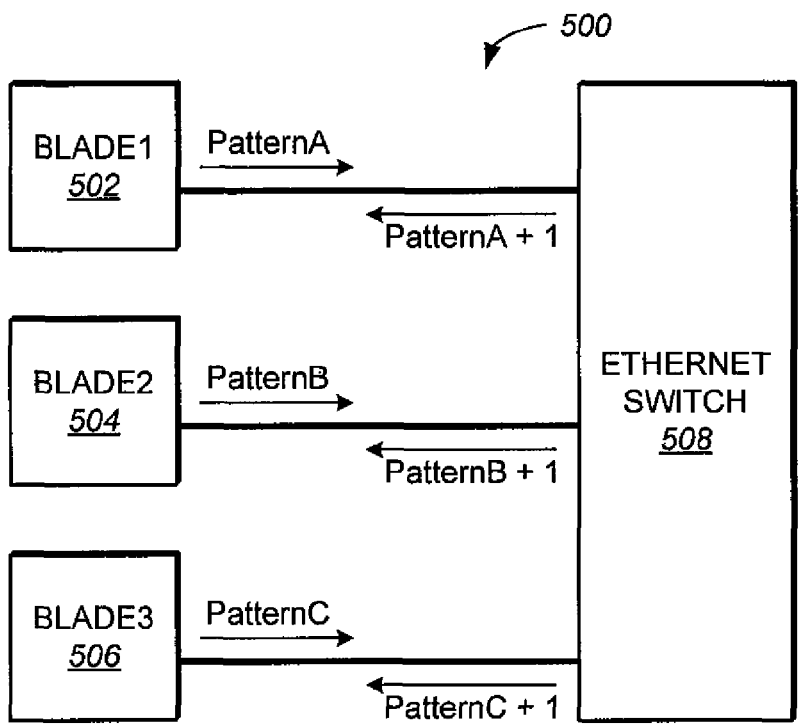
FIGS. 5-6 are examples of operations within sample blade systems.
Figure 6:
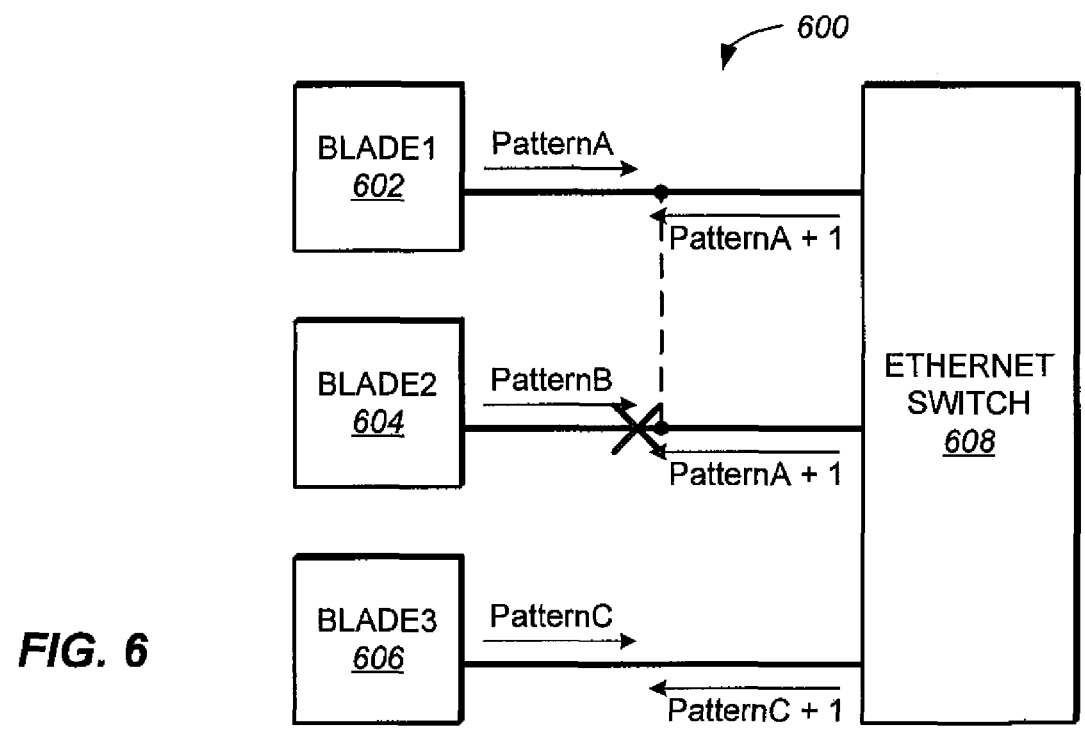

Shown in FIGS. 5-6 are examples of operations within sample blade systems 500 and 600. Blade systems 500 and 600 each includes three blades 502-506 and 602-606, respectively, and an Ethernet switch 508 and 608, respectively. For purposes of simplicity, none of the components within blades 502-506 and 602-606 and Ethernet switches 508 and 608 are shown. As shown in FIGS. 5-6, each blade is interfacing with the Ethernet switch of the respective blade system.

In FIG. 5, each of blades 502-506 transmitted a unique first pattern of characters to Ethernet switch 508 and received back a corresponding unique second pattern of characters from Ethernet switch 508. For instance, blade 502 transmitted the pattern—K28.0, K28.1, K28.2, K28.3—and received back the pattern—K28.0, K28.1, K28.2, K28.3, K28.4, while blade 504 transmitted the pattern—K23.7, K27.7, K29.7, K30.7—and received back the pattern—K23.7, K27.7, K29.7, K30.7, K28.0. The patterns need not include the same number of characters. Hence, each blade is notified of the active status of a link (not shown) from Ethernet switch 508 to a network (not shown). In the example of FIG. 6, however, cross-coupling has occurred between the interface for blade 602 and the interface for blade 604. As a result, blade 604 did not receive the correct second pattern of characters from Ethernet switch 608.

To further prevent cross-coupling problems, in one implementation, once an interface between a server blade and an Ethernet switch is disabled, an entire auto-negotiation sequence must be completed before the interface is re-established. Auto-negotiation is a lengthy process where messages are transmitted and received between two Ethernet end-points to detect the presence of a communication partner, establish transmit levels, and the Ethernet transmission speed.

Although above discussions deal with cross-coupling on receiving side of a network interface component, there may be cases where a transmit signal is coupled from two different network interface components. For example, when wiring is extremely poor. Even though this type of cross-coupling is highly unlikely and server blades transmit patterns at random times, such cross-coupling can be overcome by the addition of a timer circuit at an Ethernet switch to set a transmission window to a bounded value. Thus, if two patterns are received by the Ethernet switch within a specified time, the Ethernet switch knows that there is cross-coupling of transmission signals. The Ethernet switch can then not respond to the second pattern of characters.

The invention can take the form of an entirely hardware implementation, an entirely software implementation, or an implementation containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, or transport the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

Figure 7:
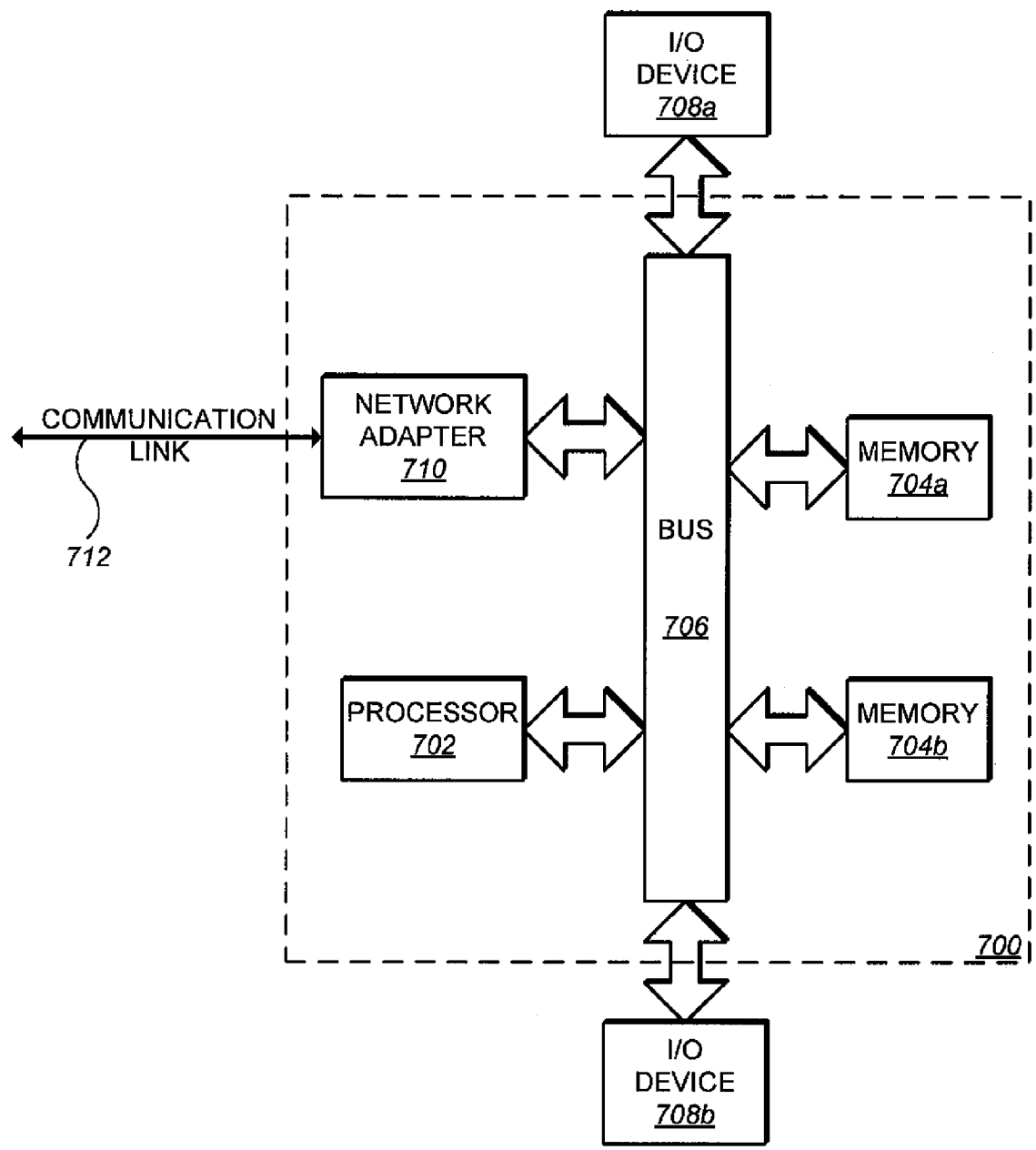
FIG. 7 depicts a block diagram of a data processing system with which implementations of the invention can be implemented.

FIG. 7 illustrates a data processing system 700 suitable for storing and/or executing program code. Data processing system 700 includes a processor 702 coupled to memory elements 704a-b through a system bus 706. In other implementations, data processing system 700 may include more than one processor and each processor may be coupled directly or indirectly to one or more memory elements through a system bus.

Memory elements 704a-b can include local memory employed during actual execution of the program code, bulk storage, and cache memories that provide temporary storage of at least some program code in order to reduce the number of times the code must be retrieved from bulk storage during execution. As shown, input/output or I/O devices 708a-b (including, but not limited to, keyboards, displays, pointing devices, etc.) are coupled to data processing system 700. I/O devices 708a-b may be coupled to data processing system 700 directly or indirectly through intervening I/O controllers (not shown).

In the implementation, a network adapter 710 is coupled to data processing system 700 to enable data processing system 700 to become coupled to other data processing systems or remote printers or storage devices through communication link 712. Communication link 712 can be private or public network. Modems, cable modems, and Ethernet cards are just a few of the currently available types of network adapters.

By having a keep-alive protocol at the physical layer level, less CPU utilization is required and addition MAC addresses are not necessary. In addition, signal cross-coupling can be easily detected since each server blade has a unique pattern of characters. The effect of cross-talk false detection at server blades is also eliminated with the creation of a modified pattern at the Ethernet switch. Since the invention can be implemented within the Ethernet standards, it is non-disruptive to Ethernet operation.

While various implementations for detecting link status in blade systems have been described, the technical scope of the present invention is not limited thereto. It is to be understood by those skilled in the art that various modifications or improvements can be added to the above implementations. It is apparent from the appended claims that such modified or improved implementations fall within the technical scope of the present invention

What is claimed is:

1. A server blade comprising:
    a generator operable to generate a first pattern of characters, wherein the first pattern of characters is unique to the server blade;
    a network interface component in communication with the generator, the network interface component being operable to transmit the first pattern of characters to an Ethernet switch and being operable to receive a second pattern of characters from the Ethernet switch, wherein the second pattern of characters is based upon the first pattern of characters; and
    a comparator in communication with the network interface component, the comparator being operable to compare the second pattern of characters to the first pattern of characters to determine whether a link from the Ethernet switch to a network, previously known to be active, is still active, in response to the network interface component receiving the second pattern of characters from the Ethernet switch.

2. The server blade of claim 1, wherein the link is active when the second pattern of characters is equal to the first pattern of characters plus an additional character.

3. The server blade of claim 1, wherein the first pattern of characters is a pattern of non-data K-characters.

4. The server blade of claim 1, wherein the network interface component is further operable to notify an operating system of the server blade that the link is inoperative in response to the second pattern of characters not being received from the Ethernet switch for three consecutive predetermine time periods.

5. An Ethernet switch comprising:
    a receiver operable to receive a first pattern of characters from a server blade, wherein the first pattern of characters is unique to the server blade;
    a state machine in communication with the receiver, the state machine being operable to create a second pattern of characters by adding an additional character to the first pattern of characters; and
    a transmitter in communication with the state machine, the transmitter being operable to transmit the second pattern of characters to the server blade to notify the server blade that a link from the Ethernet switch to a network, previously known to be active, is still active.

6. The Ethernet switch of claim 5, wherein the first pattern of characters is a pattern of non-data K-characters.

7. The Ethernet switch of claim 5, wherein the additional character is a next sequential character to the first pattern of characters.

8. A method for detecting link status in a blade system, the method comprising:
    generating a first pattern of characters at a server blade of the blade system, wherein the first pattern of characters is unique to the server blade;
    transmitting the first pattern of characters from the server blade to an Ethernet switch of the blade system; and
    comparing a second pattern of characters to the first pattern of characters to determine whether a link from the Ethernet switch to a network, previously known to be active, is still active, in response to the server blade receiving the second pattern of characters from the Ethernet switch, wherein the second pattern of characters is based upon the first pattern of characters.

9. The method of claim 8, wherein the link is active when the second pattern of characters is equal to the first pattern of characters plus an additional character.

10. The method of claim 8, wherein the first pattern of characters is a pattern of non-data K-characters.

11. The method of claim 8, further comprising:
    notifying an operating system of the server blade that the link is inoperative in response to the second pattern of characters not being received from the Ethernet switch for three consecutive predetermine time periods.

12. A computer program product comprising a computer readable storage medium, the computer readable storage medium including a computer readable program for detecting link status in a blade system, wherein the computer readable program when executed on a computer causes the computer to:
    generate a first pattern of characters at a server blade of the blade system, wherein the first pattern of characters is unique to the server blade;
    transmit the first pattern of characters from the server blade to an Ethernet switch of the blade system; and
    compare a second pattern of characters to the first pattern of characters to determine whether a link from the Ethernet switch to a network, previously known to be active, is still active, in response to the server blade receiving the second pattern of characters from the Ethernet switch, wherein the second pattern of characters is based upon the first pattern of characters.

13. The computer program product of claim 12, wherein the link is active when the second pattern of characters is equal to the first pattern of characters plus an additional character.

14. The computer program product of claim 12, wherein the first pattern of characters is a pattern of non-data K-characters.

15. The computer program product of claim 12, wherein the computer readable program when executed on the computer further causes the computer to:
    notify an operating system of the server blade that the link is inoperative in response to the second pattern of characters not being received from the Ethernet switch for three consecutive predetermine time periods.

* * * * *